(12) United States Patent
Bloching et al.

(10) Patent No.: US 7,774,463 B2
(45) Date of Patent: Aug. 10, 2010

(54) UNIFIED META-MODEL FOR A SERVICE ORIENTED ARCHITECTURE

(75) Inventors: Uwe Bloching, Nussloch (DE); Frank Brunswig, Heidelberg (DE); Bernhard Drabant, Rettigheim (DE)

(73) Assignee: SAP AG, Walldorf (DE)

( * ) Notice: Subject to any disclaimer, the term of this patent is extended or adjusted under 35 U.S.C. 154(b) by 387 days.

(21) Appl. No.: 11/493,102

(22) Filed: Jul. 25, 2006

(65) Prior Publication Data

US 2008/0028084 A1      Jan. 31, 2008

(51) Int. Cl.
*G06F 15/173* (2006.01)
(52) U.S. Cl. .................................... 709/225
(58) Field of Classification Search ............ None
See application file for complete search history.

(56) References Cited

U.S. PATENT DOCUMENTS

| | | | | |
|---|---|---|---|---|
| 5,579,384 | A * | 11/1996 | Seymour | 379/243 |
| 6,336,138 | B1 * | 1/2002 | Caswell et al. | 709/223 |
| 7,092,707 | B2 * | 8/2006 | Lau et al. | 455/423 |
| 2003/0233365 | A1 | 12/2003 | Schmit et al. | |
| 2004/0044678 | A1 | 3/2004 | Kalia et al. | |
| 2004/0177335 | A1 * | 9/2004 | Beisiegel et al. | 717/102 |
| 2005/0027871 | A1 * | 2/2005 | Bradley et al. | 709/227 |
| 2005/0086360 | A1 * | 4/2005 | Mamou et al. | 709/232 |
| 2005/0181835 | A1 * | 8/2005 | Lau et al. | 455/567 |
| 2005/0243604 | A1 | 11/2005 | Harken et al. | |
| 2005/0262189 | A1 * | 11/2005 | Mamou et al. | 709/203 |
| 2006/0179425 | A1 * | 8/2006 | Scougall et al. | 717/140 |
| 2006/0212593 | A1 * | 9/2006 | Patrick et al. | 709/230 |
| 2006/0224398 | A1 | 10/2006 | Lakshman et al. | |
| 2007/0288508 | A1 * | 12/2007 | Brunswig et al. | 707/103 R |
| 2008/0022257 | A1 * | 1/2008 | Baartman et al. | 717/106 |

OTHER PUBLICATIONS

Christiansen et al., "Web Services Description Language (WSDL) 1.1; W3C Note Mar. 15, 2001"; retrieved from the Internet: <http://www.w3.org/TR/wsdl>.

* cited by examiner

*Primary Examiner*—Vivek Srivastava
*Assistant Examiner*—Minh-Chau Nguyen
(74) *Attorney, Agent, or Firm*—Mintz, Levin, Cohn, Ferris, Glovsky and Popeo, P.C.

(57) ABSTRACT

An electronic message, containing a request to initiate a service, can be received in a landscape of computer systems providing message-based services. Thereafter, a contract can be accessed to determine if provision of the requested service is permitted. As a result, the requested service identified in the message if provision of the requested service is permitted can be initiated. Related techniques, articles, apparatus, and systems are also described.

11 Claims, 4 Drawing Sheets

UNIFIED META-MODEL FOR A SERVICE ORIENTED ARCHITECTURE

TECHNICAL FIELD

The subject matter described herein relates to a unified meta-model for a service orientated software architecture.

BACKGROUND

Software architectures devised according to a Service Oriented Architecture (SOA) enable the use of services to support the requirements of software users. In a SOA environment, resources on a network are made available as independent services that can be accessed without knowledge of their underlying platform implementation. A wide variety of service models using SOA have been developed, however, significant effort is required to make such models interoperable.

SUMMARY

An electronic message containing a request to initiate a service can be received in a landscape of computer systems providing message-based services. Thereafter, a contract can be accessed to determine if provision of the requested service is permitted. If the service may be provided, the requested service identified in the message is initiated.

The contract can define one or more of components, data types, services, interfaces, models, and/or operations. Additionally, the contract can characterize relations among entities, entities and relations among the modeling entities, and/or outflows involving entities and instances thereof. In some variations, contracts can include a reference to one or more additional contracts. Moreover, the contract can bind services, components, and operations.

The message, in some implementations, can be generated by a first system utilizing a first service model and the service can be provided by a second system utilizing a second service model.

In an interrelated aspect, an electronic message containing a request to initiate a service in a first format can be received in a landscape of computer systems providing message-based services. Thereafter, the request can be converted from a first format to a second format using a contract to enable the initiation of the requested service identified in the message.

In yet another interrelated aspect, a service oriented architecture can be modeled by defining one or more service modeling entities, component modeling entities, data types, and contracts. The service modeling entities can characterize services, the services containing interfaces which consist of one or more operations. The component modeling entities can characterize components to invoke the services (which have a particular data type), and the contract binds services, components, and operations.

The contract, in some variations, comprises a directed graph. The vertices of the directed graph can comprise one or more of services, components, and/or operations. The edges of the directed graph can comprise one or more of relations, procedures, and/or policies. In addition, the vertices and the edges of the directed graph can be flavored by attributes and/or other entities.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. Currently various service models co-exist such as the SAP Enterprise Services Framework (ESF), the SAP Business Information/Warehouse (BI), as well as various meta-data services, user interface services, controller services, collaboration, business processes, and the like. The subject matter described herein provides a common super-model and meta-data description to allow such service models to interact. Moreover, the subject matter described herein may be used to provide a repository available to numerous service models that contains necessary information about different underlying component models as well as clear and semantic description about technical application programming interfaces and their relationship, constraints and contracts to the underlying component model.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
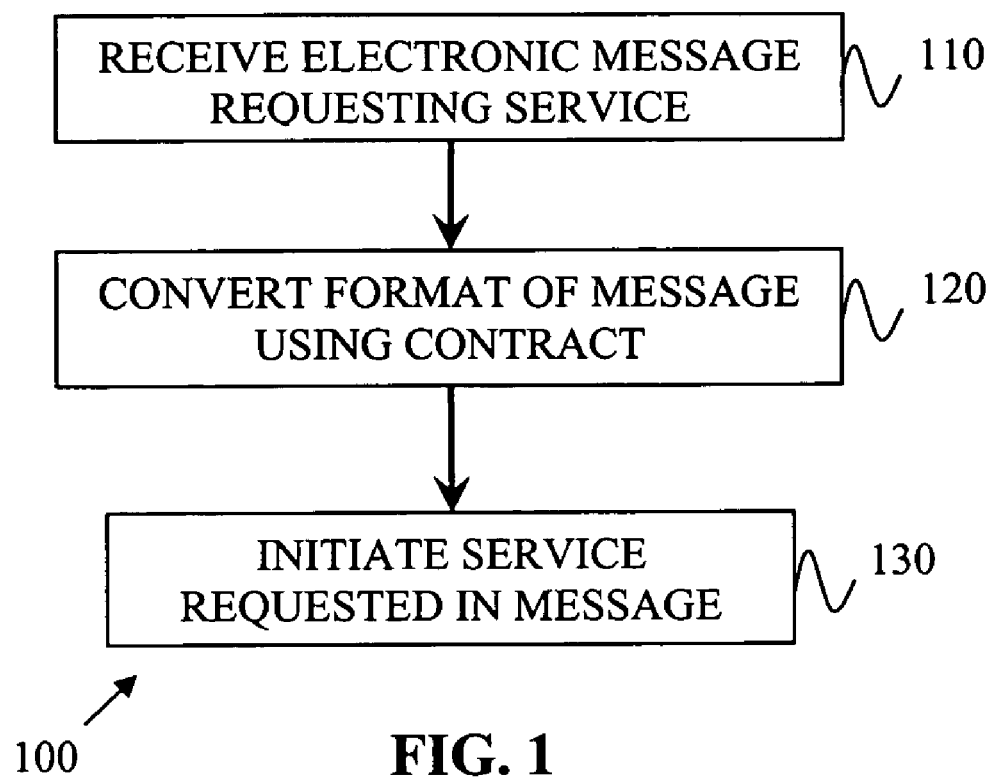
FIG. 1 is a process flow diagram illustrating a method in which a contract is used in connection with a service oriented architecture.

FIG. 1 is a process flow diagram illustrating a method 100 in which, at 110, an electronic message is received in a landscape of computer systems providing message-based services. Such a message contains a request to initiate a service and the request. Thereafter, at 120, a contract is accessed to determine if provision of the requested service is permitted, and if is determined that permission exists, at 130, the requested service identified in the message is initiated.

By definition, a service is an encapsulated software component, which provides well-defined functionality through interfaces to other services and applications or in general to consumers. The service consists of interfaces and interfaces consist of operations. Hence, a service is an abstract resource with the ability of performing tasks that represent a coherent bundle of functionality from the point of view of provider and requester entities. To be used, a service can be realized by a concrete computational resource, called provider agent. In addition a service can be assigned to a person, organization or system controlling the service. For the remote or local communication with consumers, messages or other protocols can be utilized. Both provider and consumer are roles can be played by software agents.

A Service Oriented Model (SOM) can be employed to provide a formal description of services. The SOM describes the relationships between the various entities like agents, components and services. SOM makes use of meta-data. Meta-data is used to describe aspects of services. In particular meta-data can describe details of interfaces, transport binding, semantics and policy restrictions of the service, etc. The SOM may be considered as the meta-meta-data of services which facilitate implementation and unified interface descriptions, whereas the services meta-data provides particulars of the specific service which in turn is useful for deployment and usage of the services across the Internet.

The subject matter described below provides a unified meta-model which on the one hand may serve as generic base for underlying enterprise models, and which on the other side is specific enough to be a solid groundwork on which tool-based class/operation modeling is possible and a unified API for each enterprise model may be derived. From the unified model, which is referred to herein as $M^2$, enterprise models can be derived, called M, which in turn will be used to build explicit enterprise service applications over particular representations D(M).

As stated above, the subject matter described herein relates to unified meta-model for a service oriented architecture based on general principles for service oriented meta-models. The unified meta-model can be a common framework for service models and associated component models based thereon.

Figure 2:
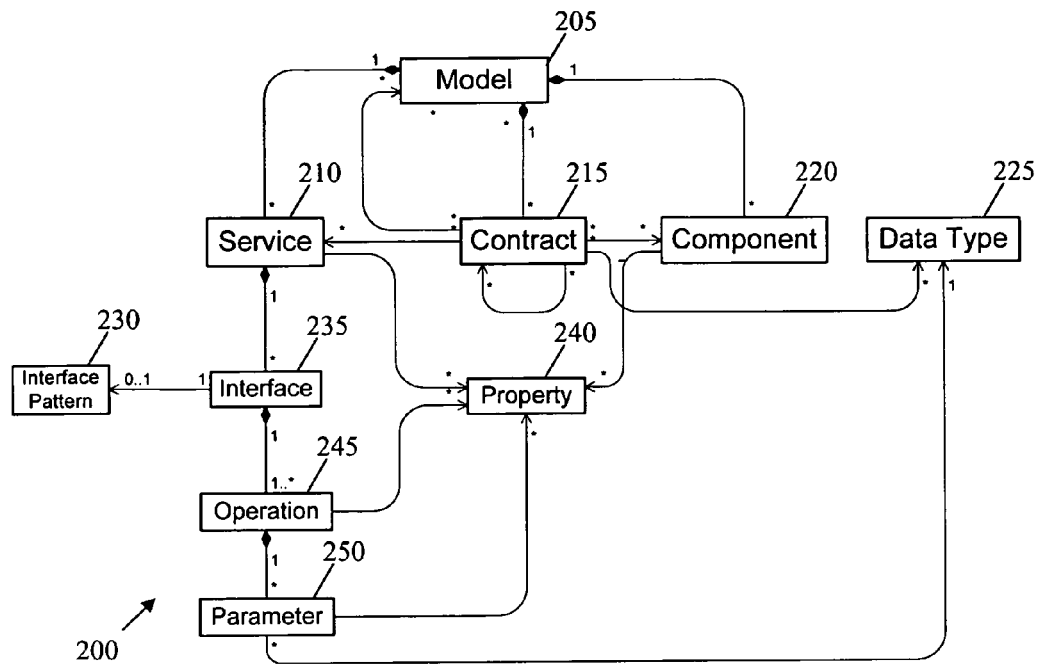
FIG. 2 is a diagram illustrating an Enterprise Service meta-model.

As illustrated in FIG. 2, the main constituents of a unified meta-model 200 can include the model 205, services 210 including interfaces 235, contracts 215, components 220, and data types 225. In some variations, the entities that can be used additionally include interface patterns 230, properties 240, operations 245, and parameters 250.

As used herein, services are services in the usual sense of SOA. However, a service may contain various service interfaces, and services may be part of components through the contracts. This in turn implies that services can (dynamically) be added to components. The service centric view of the model is called service model.

Components can be characterized as the building blocks of the model that form the entities which will be used in order to establish the services landscape of the model and the proper functioning and invocation of services. The component centric view of the model is called component model.

Services, components, operations, etc. are bound through contracts. A contract describes relations, procedures and policies of services and components.

In some variations, models may refer to other models. This arrangement means that a given model can refer to components and services of other models. In this way not only intra-model communication but also a inter-model communication is possible based on well defined interfaces.

A contract can describe relations, procedures and policies of services and components. Contracts usually use particular grammars. The contracts can be visualized as (directed) graphs where the vertices are made of services, components, operations, etc. and relations, procedures and policies are the edges. Vertices and edges may be characterized by attributes and other entities.

Contracts can consist of the following grammatical, relational, logical operations and descriptive elements:

I) Relations: -is a-, -has-, -owns-, -contains-, -aggregates-, -operates-/-executes-, -describes-, -associates to-, -results in-, -provides-, -uses-, -requires-, -sup-plies-, -depends on-, -joins-,
   Logical Operations: -and-, -or-
II) dynamic relationships through sequence diagrams, message exchange and process decision
III) constraints of relations and entities
IV) requirements such as instance attributes/members of entities
V) allowed states of attributes and relationships
VI) allowed procedures between entities
VII) may depend on or consist of other contracts In addition, contracts can define data types and relate models to models both from a service model point of view as well as from the component model point of view. The link to other models will be governed through contracts; they describe the way a model can use another model's services and operations.

Grammatical relations "uses", "requires", "needs" etc. implicitly define a local hierarchy both for the design-time as well as for the runtime. In this respect one might assign components—or in general entities—a certain context based order or classification. If the order of the entities is independent of a context one then speaks of primary, secondary, ternary, quaternary etc. components and entities. For example, in the business object model, a business object is a primary component, whereas a query is a ternary component. This classification comprises essential information for deriving and introducing interface patterns of the associated service model in a canonical form related to the component model.

Furthermore, contracts may contain descriptions of entities, processes and sequences, which can be employed by the actual implementation and can be used for documentation. In particular, the descriptions of the specialization of entities can be used in the documentation, in the design tools, and in the proxy generator of a typed proxy for this specific component model.

A contract can comprise:
1. Entities: components, data types, services and interfaces, models, operations etc.
2. Relations: ordered relations associate entities. The relations may be binary, ternary, or in general k-ary. Unary relations may be considered as properties of entities. Relations can be enriched with additional data needed in the procedural steps of the model, like for instance the knowledge of entities needed for the invocation of methods and operations of a certain service, etc.
3. Descriptions: describe entities and relations
4. Procedures: describe outflows involving entities and instances thereof. Procedures potentially provide the bridge between class and instance models.

As illustrated in FIG. 2, contracts can be particularly derived specializations of a general contract of a class model. However, it will be appreciated that contracts can be defined in terms of arbitrary extended language constructs. Hence, contracts may be modeled in any appropriate modeling language. Likewise, for example, the modeling of $M^2$ in terms of UML class diagrams may be substituted by modeling in any other modeling language, like for instance CCTS.

Communication between services can also be described in contracts. In a service oriented architecture, communication is characterized through data exchange in terms of messages and data objects. Service communication is now potentially possible within a given model or cross-model wise using contracts.

Figure 3:
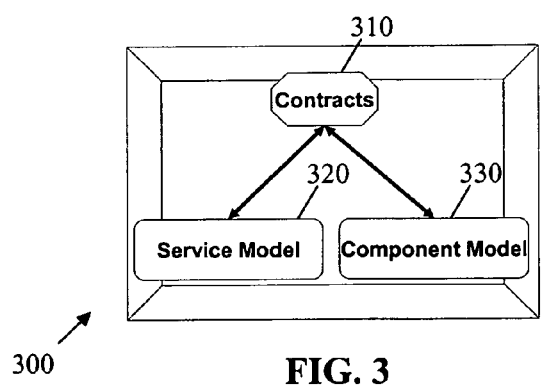
FIG. 3 is a diagram illustrating a contract linking a service model with a component model.

In the generalized model $M^2$ it is possible that components and services of different models $M_A$ and $M_B$ communicate with each other as is illustrated in the diagram 300 in FIG. 3. With this arrangement, the relevant contracts in the models link the corresponding components and services of $M_A$ and $M_B$. In addition, the models can refer to each other, which is done either in the service communication contract or in a separate contract. For example, a contract 310 may allow for the interaction between a service model 320 and a component model 330.

Inter-application communication (at runtime) can then be verified by means of the contracts of the models of the applications indicating which services and operations may communicate with each other. Once this sort of model handshake has been carried out the communication of the applications is possible.

Based on the relations illustrated in FIG. 2, an application programming interface (API) may be established. A sample API is illustrated in Table 1 that is relevant for the entity model in $M^2$.

TABLE 1

Model modelType
components
services
contractDescriptors
getModelType
getComponent(name)
getComponents( )
getService(name)
getServices( )
getContractDescriptors( )

Service models can be built upon the unified meta-model $M^2$ which are specific instances of the unified meta-model. Hence, service-models have a common description in terms of $M^2$. This arrangement allows generic communication and service-enabling which can be tool-based. Once a service model is defined, its API is governed by the unified picture of $M^2$ and a unified handling of different service models and at least a rudimentary runtime proxy generation is then possible. In addition, different service models can refer or communicate with each other by contractual descriptions.

The invocation and lookup of services can be described in the services list of components which in turn provides a list of executable service interfaces and operations. The input and output data can be read off from the operations. The contracts in addition identify to services which services may be utilized—a verification of the input/output information is necessary, of course.

Figure 4:
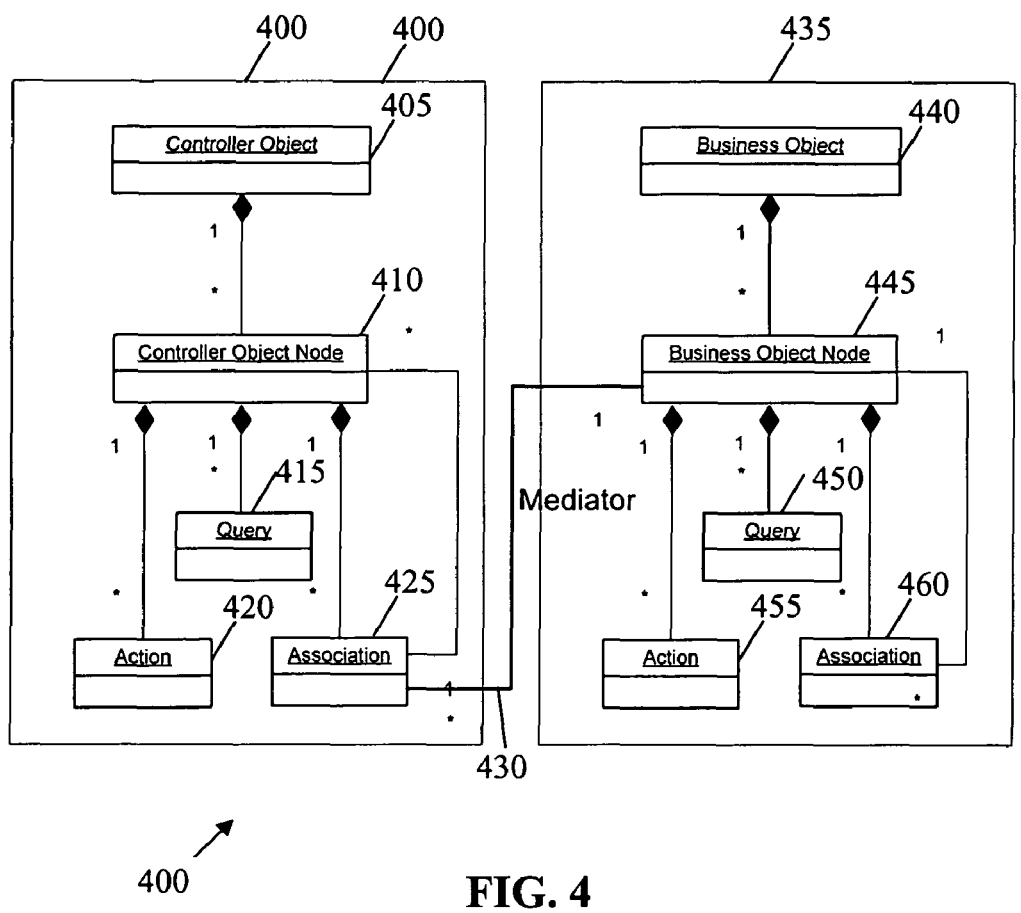
FIG. 4 is a diagram illustrating the interrelation between a controller component model and a business object model.

As illustrated in FIG. 4, a business object component model 435 can consist of entities like business object 440, business object node 445, query 450, action 455, and association 460. Each of these entities are components. Within the description of these entities the regular entities of the related business object service model can be shared. For instance, the definition and description of properties, simple data types, structures, and tables can be shared between the component and the service models.

The business object 440 is a first class component and contains nodes. The business object node 445 is a second class component and contains queries 450, actions 455, and associations 460. The queries 450, actions 455, and associations 460 (which can act as mediators between to business object nodes) are third class (tertiary) components in the underlying meta-model. All entities can be described in the component model in a more qualified way. For example, the associations can be described as composition associations, intra business object associations, and cross business objects associations. A composition association between nodes describes an existential dependency between a parent node and a child node. An intra business object association describes a relation between two nodes in the same business object of any kind and semantic, which is not a composition. A cross business object association describes a relationship between two nodes of two different business objects. In addition, the important contract is that the business objects support the transactional interface and the transaction contracts. The purpose of business objects is to provide the persistence and concurrency interfaces to store 'real-world' business relevant data in a consistent state on the database. This main contract need not be expressed in the business object component model explicitly.

On the other hand, the business object service model (as opposed to the business object component model) can consist of interface patterns like a query interface pattern, an access interface pattern, a transaction interface pattern, and an action interface pattern. In addition, more interfaces can be supported like value set or incident interfaces.

The query interface pattern can include operations like 'init query' and 'execute query'. These operations have a signature, which provides the necessary parameters to process these operations technically. The pattern within the signature can be described by the name of business object the query belongs to, the name of the business object node the query belongs to, the kind of options like sorting, fuzzy search and more, and the query input parameters describing the query select options of parameters like equal, less, or between.

The association between the business object model and the service model can be described to get a technical binding. The first class component of the business object component model is the business object type. Therefore, the business object type can form part of the query interface pattern operations. This relationship means that each query interface operation can contain an explicit reference to the related business object. This requirement can be fulfilled by providing a class describing the related business object as parameter of each query interface operation. Another possibility is to provide a string or to provide an enumeration or unified class identifier.

The specification of the business object type for a query interface pattern operation may not be enough to identify the query uniquely. In such cases, the next step can be to provide the name of the business object node in a similar way. The description of the business object name, business object node name, and the concrete query name is sufficient to address the query on the business object component model uniquely. The connection between the business object service model and the business object component model concerning queries can be established. The same approach can be followed to establish the connection between all other entities of the business object service and business object component models.

A contract can be defined concerning the query interface pattern, which combines a business object type and a parameter of the query interface operations. This defining can be accomplished by describing the source of the contract as business object type and the destination of the contract as string containing the business object type (which may not be the only contract definition). Another possibility is to describe the destination as a class reference containing an instance of the business object type. An open set of possibilities exist to describe this contract. In the more sophisticated approaches the business object to work on could be set explicitly by calling special interface operations like SetBusinessObject, SetBusinessObjectNode, and so on. So, this example makes clear that the contract must explain and describe explicitly the requirements of the service model. The contracts are not restricted on single service operations but can describe the interaction and requirements of a set of operations and parameters to fulfill a concrete and special purpose on a concrete component model.

Each entity of the business object component model can have properties, which provide additional information about these entities. For instance, the property enabled on an action describes whether the action can be used or not. The property enabled can be attached on the entities node, query, action, association, and attribute.

A business object service model can consist of a consumer and provider part. The consumer and provider interface pattern might be different. For example, in the concrete the transactional save of a business object is just an operation save, which must be called on the consumer side. On the other hand, the transactional save must be separated into several phases on the provider side. First, on all service providers the operation check must be called. If all service providers confirm its transactional consistency the operation save must be called on all service provider instances. The transaction can either saved successfully or faulty. In both cases the service providers will be notified by calling the operation cleanup with the actual transactional state information.

The business object model of FIG. 4, can obey, for example, the following contracts:

---

1. BusinessObject - is a - component
2. BusinessObjectNode - is a - component
3. Query - is a - service interface
4. Query.execute - is a - service interface operation
5. Query - depends on - BusinessObjectNode
6. BusinessObjectNode - depends on - BusinessObject
7. Association - is a - component
8. "Source BO" - describes a - ((BusinessObject - associtates to - Association) - and - (Association - depends on - BusinessObjectNode))
9. "Target BO" - describes a - (Association - associates to - BusinessObject-Node).

---

As illustrated in FIG. 4, the controller object component model 400 is related to the business object component model 435 in the way that a controller object 505 can consist of the same component entities like nodes 410, queries 415, actions 420, and associations. The controller object layer can provide a consumer scenario-oriented infra-structure with appropriate breakout possibilities to enrich consumer interface capabilities. The mediator association 430 is a special type of association like the intra-Controller-Object or the cross-Business-Object associations.

For example, with conventional techniques, it is not possible to deal with semantic messages in a user friendly way because the business object layer raises many instances related error messages in which an end user is not interested really. Currently, it is not possible to aggregate those messages into a single scenario-relevant message. Also it is not possible to raise success messages at appropriate times in the execution timeline.

While one purpose of business objects is to provide an appropriate interface to the persistence layer, it is the purpose of the controller objects to provide an appropriate interface to the user interface process and control layer. Another important example is the adequate initialization of business object node elements. Here, the user interface expects that many pre-initialized elements can be displayed in a table control, for instance. However, currently if the end user does not fill all the lines, it leads to error propagation from the backend due to element creations with initial values. Also here a separate processing layer is required.

On the other hand, the transaction interface, which provides necessary operations and notifications for the persistence, is not supported for controller objects. However, the interaction and message interfaces provide the necessary notifications to deal with human-readable messages in a user-friendly way. In particular, the controller object component model uses the business object model, which means that business objects can be used by controller objects. The other way around is not allowed (i.e., it is not possible for business objects to use controller objects). The controller object component model 400 illustrates that the same component model can be associated to different service models consisting of different interface pattern.

Like the business object service model the controller object service model consists of a consumer and a provider part. Most of the consumer interface operations can be mapped to the appropriate provider interface operations directly. The visibility of the interaction interface pattern can be restricted to the service provider. Also, the message interface, which can provide a notification mechanism for controller service provider based on business object message management, is not visible on the consumer side.

Figure 5:
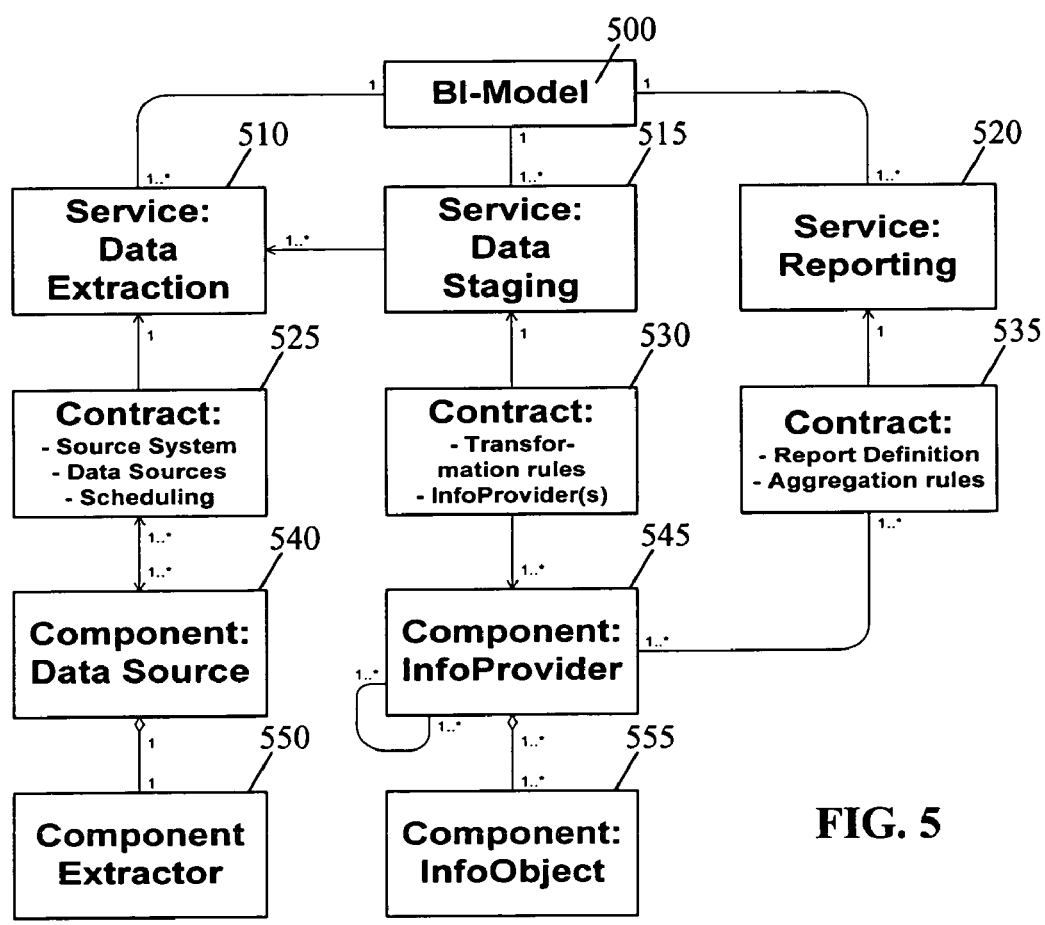
FIG. 5 is a diagram illustrating a Business Intelligence meta-model.

A Business Intelligence (BI) model 500 as illustrated in FIG. 5 can have a service-oriented architecture according to the following main tasks BI has to fulfill:

Import data from external sources, e.g. retrieve Sales Order Data from an application system, into a BI system.

Transform and store that data in a way that is optimized for reporting. An example for a transformation is the calculation of business key figures like the total revenue of a customer in a specific period based on the incoming sales order data.

Supply Reporting Services that allow for reporting according to business needs, e.g. a report that shows the ten top customers concerning total revenue.

A data extraction part of the BI is responsible for extracting data and sending it to the BI system. It can consist of the following entities:

Data Extraction Service 510 which is responsible for triggering the extraction of data from external sources, e.g. from application systems.

Extraction Contract 525 that e.g. defines which Data Source is to be used by a specific Data Extraction Service and which Data Extractor is to be used by the Data Source.

Data Source 540 which is assigned to a specific external resource, e.g. a specific application system. A data source defines the structure of the data that is to be extracted from the external resource and which is to be sent to the BI system. Moreover, actions such as update behavior (full-update/delta-update) within the BI-System are defined here.

Data Extractor 550, which represents the technical vehicle (an ABAP function module) to extract data e.g. data from a Sales Order application.

The data staging part of the BI is responsible for receiving the incoming data retrieved by the Data Extraction Service, transforming that data e.g. according to business rules and store it in so called InfoProviders. The entities can include:

The Data Staging Service 515 which is responsible for performing transformations on the incoming data and storing it. This service first calls the Data Extraction Service to trigger the extraction of the application data before it can start the transformation process.

Data Staging contract 530 which defines what kind of transformations are to be performed on the data supplied by the Data Extraction Service and in which InfoProvider(s) the transformed data is to be stored.

InfoProvider(s) 545 that are responsible for storing the data created by the Data Staging Service 515. The layout and technical structure of an InfoProvider is optimized for reporting purposes.

InfoObjects 555 are the smallest granularity of data that can be stored in a BI system, e.g. the last name of a customer or the number of products ordered. They are the building blocks for defining InfoProviders. InfoObjects can and should be reused in different InfoProviders as much as possible to keep their number and the corresponding master data as small as possible. We differentiate two kinds of InfoObjects: The so called characteristics and key figures. Characteristics are the entities that describe semantical keys similar to keys known from data bases, e.g. the name of a customer. Charac-teristics are used for selecting data from an InfoProvider. Key figures are used for storing numerical data, e.g. the amount of a specific sales order.

The Reporting part of the BI is responsible for supplying the entities that are necessary to create reports based on the data stored in InfoProvider(s) 645 and can include:

Reporting Service 520 which is responsible for triggering the start of a specific report, e.g. a report that shows the top ten customers concerning total revenue in the last month.

Reporting Contract 535 defines which Reporting Service is based on which Info-Provider(s). Moreover items such as the aggregation behavior (maximum, minimum, average) of key figures are defined here.

A Data Source is a primary component. A Data Extractor is a secondary component associated with a Data Source. An InfoProvider is a primary component. An InfoObject is a secondary object associated with one or more InfoProviders.

As described above, $M^1$-models can be configured to communicate with each other/make use of each other. For example, the BI model can be made to communicate with the Business Object model to retrieve data used for reporting purposes.

With this arrangement, the contract defines how one model is linked to the other one. Here is an example how such a contract may look like:

The BI Model uses the Business Object Model

The BI Data Extraction Service supplies Business Object Name, Business Object Node name, Query name and query input parameters to a BI Data Extractor.

A BI Data Extractor uses Business Object Model->Queries for retrieving Business data according to the parameters passed to it by the BI Data Extraction Service.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. An article embodied on non-transitory tangible media and operable to cause data processing apparatus to perform operations comprising:

receiving an electronic message generated by a first system in a landscape of computer systems providing message-based services, the message containing a request to initiate a service by a second system, the first system utilizing a first service model and the second system utilizing a second service model, the first service model being different to and incompatible with the second service model;

converting the request from a first format according to the first service model to a second format according to a second service model using a contract, the contract being generated using a service oriented architecture model which defines unified interface descriptions among differing service models within a service oriented architecture; and initiating, in the second system, the requested service identified in the message to allow messaging-based interaction between the first system and the second system as specified by the requested service using the respective first and second service models;

wherein the contract defines:
one or more of components, data types, services, interfaces, models, or operations, relations among entities, each of the entities comprising components within the service oriented architecture, the relations defining a hierarchical classification of the components to enable a corresponding application programming interface to be established, allowed procedures between entities and instantiations of objects corresponding to the entities, and a reference to one or more additional contracts, such reference defining how such contracts are linked to by defining relations among entities in different models.

2. An article as in claim 1, wherein the contract defines one or more of components, data types, services, interfaces, models, or operations.

3. An article as in claim 1, wherein the contract defines relations among entities, each of the entities comprising components within the service oriented architecture.

4. An article as in claim 1, wherein the contract characterizes relations among the modeling entities, each of the entities comprising components within the service oriented architecture.

5. An article as in claim 1, wherein the contract characterizes outflows involving entities and instances thereof.

6. An article as in claim 1, wherein the contract includes a reference to one or more additional contracts.

7. An article as in claim 1, wherein the contract binds services, components, and operations.

8. A computer-implemented method comprising:

receiving an electronic message generated by a first system in a landscape of computer systems providing message-based services, the message containing a request to initiate a service by a second system, the first system utilizing a first service model and the second system utilizing a second service model, the first service model being different to and incompatible with the second service model;

converting the request from a first format according to the first service model to a second format according to a second service model using a contract, the contract being generated using a service oriented model which defines unified interface descriptions among differing service models within a service oriented architecture; and initiating, in the second system, the requested service identified in the message to allow messaging-based interaction between the first system and the second system as specified by the requested service;

wherein the contract defines:

one or more of components, data types, services, interfaces, models, or operations, relations among entities, each of the entities comprising components within the service oriented architecture, the relations defining a hierarchical classification of the components to enable a corresponding application programming interface to be established, allowed procedures between entities and instantiations of objects corresponding to the entities, and a reference to one or more additional contracts, such reference defining how such contracts are linked to by defining relations among entities in different models.

9. A method as in claim 8, wherein the contract binds services, components, and operations.

10. A method as in claim 8, wherein each service model is generated by: defining at least one service modeling entity characterizing services, the services containing interfaces, the interfaces consisting of one or more operations; defining at least one component modeling entity characterizing components to invoke the services; defining at least one data type to invoke the services; and defining at least one contract, the contract binding the services, components, and operations.

11. A method as in claim 8, wherein the contract is a directed graph, and wherein vertices of the directed graph comprise at least one of services, components, or operations, and wherein edges of the directed graph comprise at least one of relations, procedures, and policies, wherein vertices and edges of the directed graph are flavored by attributes.

* * * * *